United States Patent [19]

Sisk

[11] Patent Number: 4,699,357
[45] Date of Patent: Oct. 13, 1987

[54] REINFORCED INDUSTRIAL BUTTERFLY VALVE

[75] Inventor: David E. Sisk, Bonne Terre, Mo.

[73] Assignee: Ultraflo Corp., Ste. Genevieve, Mo.

[21] Appl. No.: 885,171

[22] Filed: Jul. 14, 1986

[51] Int. Cl.⁴ .............................................. F16K 1/22
[52] U.S. Cl. ..................................... 251/306; 137/315
[58] Field of Search ............... 251/305, 306, 307, 308; 137/315

[56] References Cited

U.S. PATENT DOCUMENTS

| | | | |
|---|---|---|---|
| 2,740,423 | 4/1956 | Stillwagon | 251/306 |
| 2,994,342 | 8/1961 | Stillwagon | 251/306 |
| 3,100,500 | 8/1963 | Stillwagon | 251/306 |
| 3,143,132 | 8/1964 | Pangburn | 251/306 |
| 3,241,806 | 3/1966 | Snell, Jr. | 251/306 |
| 3,595,523 | 7/1971 | Felton | 251/306 |
| 3,781,043 | 12/1973 | Hagmann | 285/363 |
| 3,910,552 | 10/1975 | Hills et al. | 251/307 |
| 4,291,863 | 9/1981 | Gachot | 251/308 |
| 4,398,696 | 8/1983 | Szilagyi et al. | 251/307 |

Primary Examiner—A. Michael Chambers
Assistant Examiner—John C. Fox
Attorney, Agent, or Firm—Paul M. Denk

[57] ABSTRACT

A reinforced industrial butterfly valve incorporating a tubular housing, having a disc valve stem mounted for pivotal movement within the flow passage provided through the housing, a resilient seal provided around the interior periphery of the flow passage, to provide a positive seal during pressure or vacuum service of this valve, during its application, the valve housing having apertures provided diametrically aligned therein, one of the apertures being counterbored for accommodating a bushing for mounting of the extending proximate end of the valve stem, while the opposite aligned aperture extending entirely through the tubular housing, having a counterbore arranged partially therethrough, and into which another bushing and a packing mount for accommodating the securement of the opposite extending disc valve stem so as to furnish a positive disc control during continuous industrial applications of the valve of this invention.

3 Claims, 8 Drawing Figures

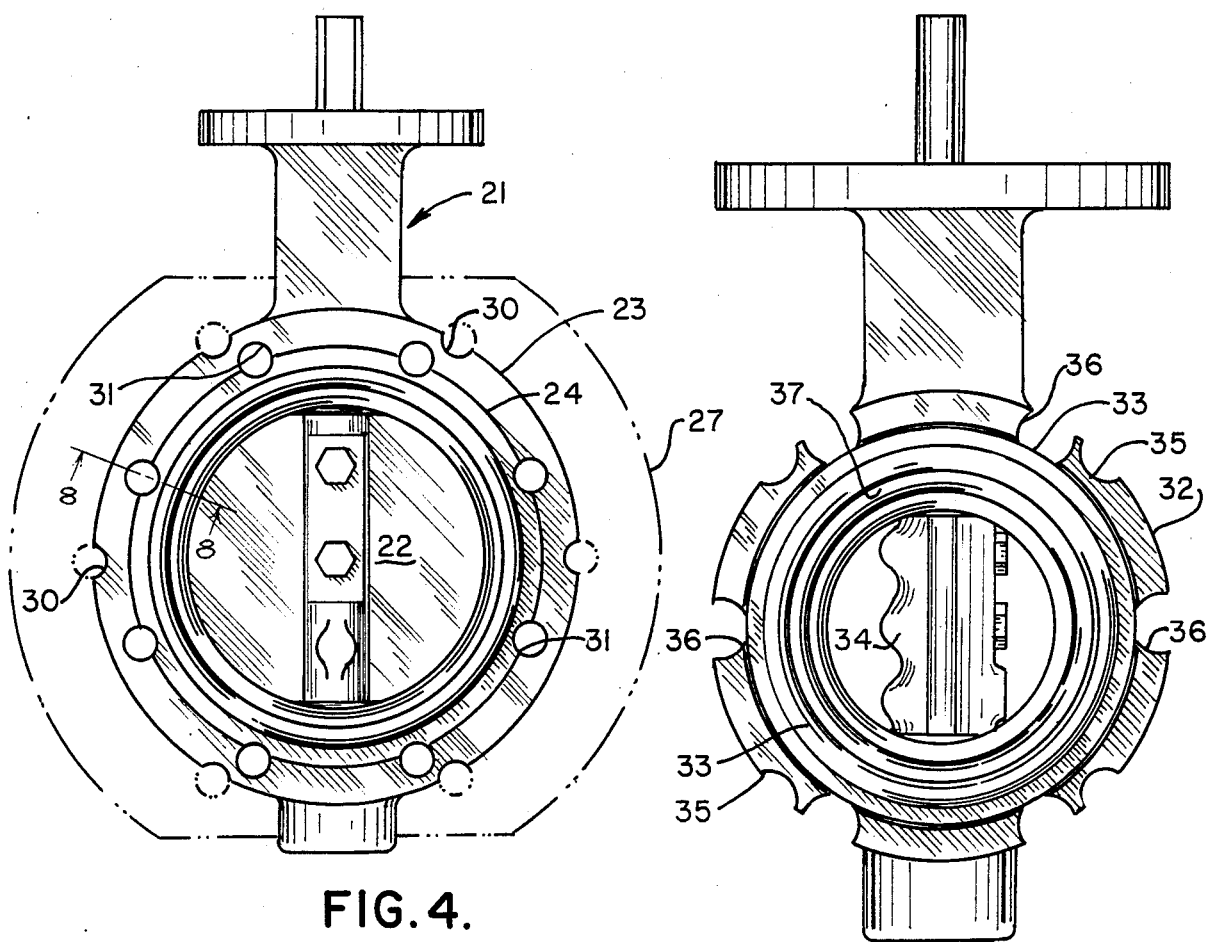
FIG. 4.
FIG. 5.
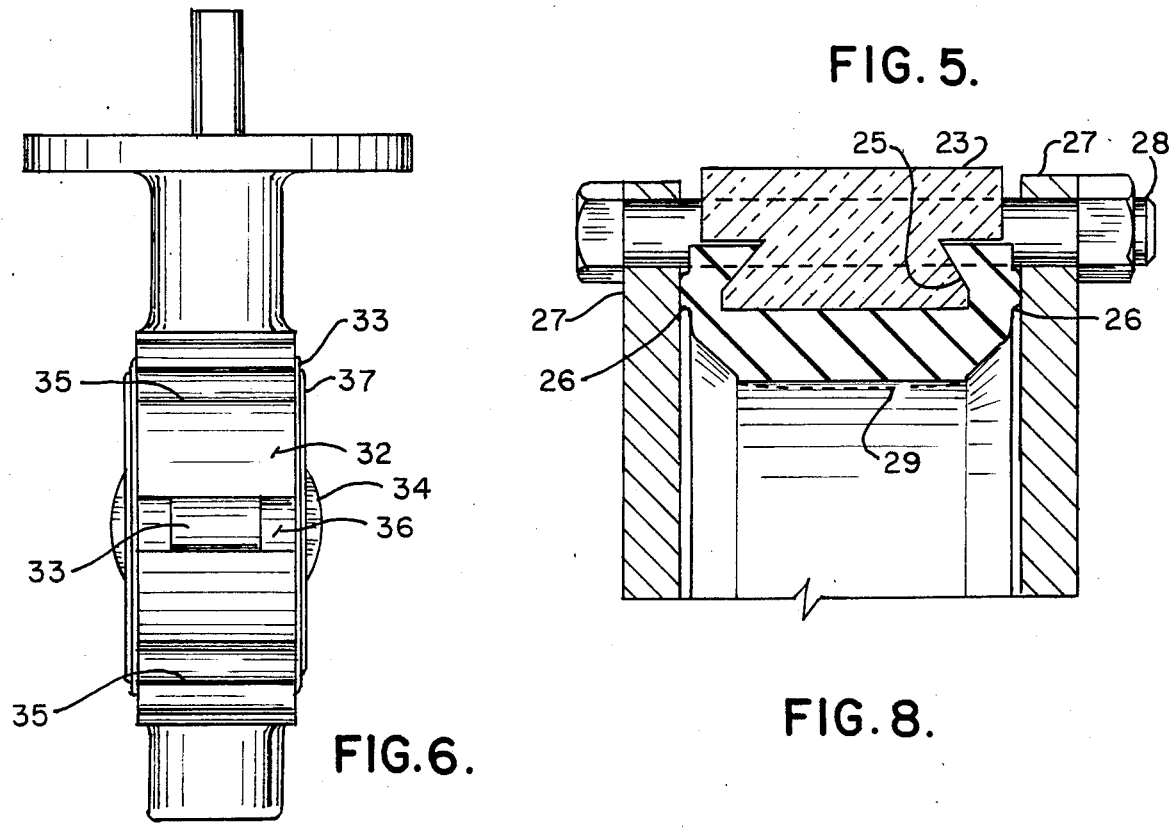
FIG. 6.
FIG. 8.

REINFORCED INDUSTRIAL BUTTERFLY VALVE

BACKGROUND OF THE INVENTION

This invention relates generally to a valve means for application within a flow line, and more particularly pertains to a reinforced pivotal butterfly valve prepared for industrial applications and which incoporates bushings and packing means to sustain the useful life and application of the valve during installation and continuous usage.

The current invention is intended as an improvement upon the standard technology pertaining to disc valves that are currently in existence and for application for industrial usage. For example, disc valves of this type are frequently utilized within materials flow lines, whether it be the type of material which may be of fluid consistency, or even of granular material and which are flowed to or from a storage bin either for accumulation therein, or to a location for shipment for storage or usage. For example, disc valves of this type are frequently applied into the flow lines connecting with a tank trailer, and of the type which can and are used for the transportation or storage of fluids, such as liquids, or even other granular materials, that are frequently shipped by transit. It is likewise applicable that the disc valve of this type may also be used generally in tubular flow lines, whether they be used in association with the loading and unloading of barges, ships, or other means of transportation or storage.

The type of disc valve normally employed for this purpose, and which functions as a shutoff of flow through a conveyor in which these type of materials may be conveyed, are generally shown in various prior art patents, such as the U.S. Pat. No. 2,740,423, to Stillwagon, and therein identified as a valve for usage for these subject purposes. Another U.S. Pat. No. 2,994,342, Stillwagon, discloses further improvements upon this style of valve, and more specifically the sealing means used in conjunction therewith. In addition, Stillwagon possesses yet another U.S. Pat. No. 3,100,500, upon a disc valve with a removable seat and a unitary stem incorporating its disc, and a seat and stem wear-sleeve therefor. Finally, there is a U.S. Pat. No. 3,241,806, to Snell, Jr., disclosing a disc type valve having a plastic layer on its resilient seating surface. The current invention, as distinct from these earlier models of disc valves for use for industrial purposes, incorporates the technology of utilizing a disc type valve within a flow tube, having a stem mounted for pivotal movement, incorporating a resilient seat against which the disc valve can seal when arranged into closure, but the subject matter of this invention incorporates counterbores within the apertures formed for seating of the valve stem, and in which polymer, and preferably acetal stem bushings are arranged to provide for the convenient and low frictional mounting of the disc valve and its stem within the tubular housing, and which is likewise resistant to corrosion, and fatigue.

It is, therefore, the principal object of this invention to provide discrete bushings arranged for mounting within predisposed counterbores formed within apertures arranged diametrically of the flow passage through a materials passing tubular housing, and into which a disc valve and its stem may be pivotally mounted for precise turning therein between its open and materials passing condition to its closed and sealed position against its resilient seat.

Another object of this invention is to provide the arrangement of counterbores diametrically disposed within a tubular housing, one of which opens into the flow passage through the said housing, while the other counterbore opens exteriorlly of the housing, in order to facilitate the assembly of the stem mounted disc valve into its operative position within the housing during assembly and installation.

Another object of this invention is to provide bushings used in conjunction with a disc valve within an industrial butterfly valve assmbly, and which bushings reduce the frictional engagement of the valve stem during its manipulation, are resistant to any immediate wear, and prevent any corrosion occuring between the stem and the housing in which it pivotally mounts.

Another object of this invention is to provide a stem packing that locates proximate the stem bushing within one of the apertures provided through the tubular housing, so as to seal off that aperture against leakage, and to assure a positive seal for a pressure or vacuum service of the butterfly valve during its industrial applications.

Another object of this invention is to provide a corresponding counterbore provided for the aperture for mounting of the opposite extending stem of a disc valve, and which counterbore and aperture do not extend through the tubular housing so as to provide an automatic seal against leakage and to further insure that positive seal for the pressure or vacuum service of the valve when applied in industrial applications.

These and other objects will become more apparent to those skilled in the art upon reviewing the summary of this invention, and upon undertaking a study of the description of its preferred embodiment in view of the drawings.

SUMMARY OF THE INVENTION

This invention contemplates the formation of an industrial valve, one that is used within a tubular housing which may be incorporated within a flow line, and one which, as previously explained, is intended for the passage and flow of fluid materials, whether it be of a liquid or granular consistency. The valve of this invention incorporates a tubular housing, through which a flow passage is provided approximately centrally thereof, and a disc valve mounted upon its stem is pivotally disposed within the flow passage, across the tubular housing, and which may be turned either into a closed position, for preventing the passage of any materials therethrough, or which may be pivoted approximately ninety degrees, into an open position, to allow the nearly unobstructed flow of materials through the tubular housing and the flow line in which it is incorporated. There may also be provided a resilient seat, around the interior of the tubular housing, proximate its flow passage, so that when the disc valve is arranged across the said passage, it snugly binds against the seat, so as to provide a seal therewith, such that when the flow line may be used for pressure or vacuum service, the seal insures a positive seal against leakage when the disc valve is maintained in continuous closure thereagainst.

The particular resilient seat or seal of this invention is formed of a rubber or polymer composition, and more specifically, it has been found that molding the seal from a composition of carboxylated nitrile, provides a more effective seal than conventional nitrile butadiene rubber composition. But, obviously, a seal formed of this type of rubber likewise could be used in the fabrication of the resilient seal of this invention. The carboxylated nitrile is produced by polymerizing butadiene, acrylonitrile, and a carboxylic acid. The presence of the acid group in this chain is what gives it its unique properties over conventional rubber. Resilient seals formed of this material exhibit superior abrasion resistance, and offer a tougher valve seat with excellent tensile strength. The seals also operate and exhibit excellent physical properties even at elevated temperatures. Thus, it provides the butterfly valve with its ability to seat, and properly seal, to withstand even higher pressures. Such seals are resistant to attack by many of the hydrocarbons, fats, oils, greases, hydraulic fluids, and many mild and moderate chemicals and acids.

The subject matter of this invention improves upon the standard type of disc valve of this invention, by incorporating counterbores within its formed apertures in which the pivotal stem mounts, and within these counterbores polymer bushings are arranged so as to provide a reduced frictional mounting of the disc valve therein, and so as to prevent the presence or generation of any corrosion between the valve stem and the walls of the housing in which they pivotally mount. In addition, the arrangement of these bushings, within the structure, are effective for eliminating gaulding and frozen stems which have occurred in valves, and their operations, as currently in existence and as used in applications. In addition, the counterbores formed for securement of these bushings are particularly disposed, one of the counterbores opens into the interior of the tubular housing, in communication with it flow passage, while the other counterbore as formed within its associated aperture opens only exteriorly of the tubular housing, and receives its bushing through an external fit during the butterfly valve assembly. The reason for this is to facilitate the assembly of the device, whereby the initial bushing may be inserted interiorly of its counterbore, by inserting through the internal flow passage of the tubular housing and press fitted into its seating relationship. In addition, this arrangement allows for the insertion, also, of a stem packing within the externally oriented counterbore to seal the valve against leakage particularly when it is utilized in heavy industrial applications where pressure or vacuum conditions may be present. Following this, the disc valve and its stem may be inserted into their operative positions, while the final bushing is inserted fron an exterior position onto the other extending end of the valve's pivotal stem, for its pressure fit within the tubular housing, and for precisely mounting of the disc valve into its operative position.

In addition to the foregoing, the bushings for the valve of this invention are constructed of a polymer, and preferably an acetal, and which are designed for achieving the purposes as previously described, which is to provide a reduced frictional operation between the disc valve and its stem, with respect to the tubular housing in which they mount, to prevent the contact of these components together, so as to prevent any corrosion and gaulding from developing, which under normal circumstances can lead towards frozen stems which prevent the effective operation of the standard disc valves during their applications, particularly when functioning in inclement weather, such as under cold and extreme temperature conditions. With the incorporation of these type of bushings within the industrial valve of this invention, it has been found, through testing, that the life of this current valve is extended approximately twice the length of the usage of valves of the type that are currently available in the prior art.

BRIEF DESCRIPTION OF THE DRAWINGS

In referring to the drawing, FIG. 1 provides an isometric view of the reinforced industrial butterfly valve of this invention, showing its disc valve in an opened position, with parts of the tubular housing being broken away so as to disclose the valves various operating components;

FIG. 4 is a front elevational view showing a modified valve of this invention, and particularly in its relationship when installed within a material flow line;

FIG. 5 is a front elevational view of a further modified industrial butterfly valve of this invention;

FIG. 6 is a side view of the valve shown in FIG. 5;

FIG. 8 is a sectional view taken along the line 8—8 of FIG. 4.

DESCRIPTION OF THE PREFERRED EMBODIMENT

Figures 1, 2, 3:
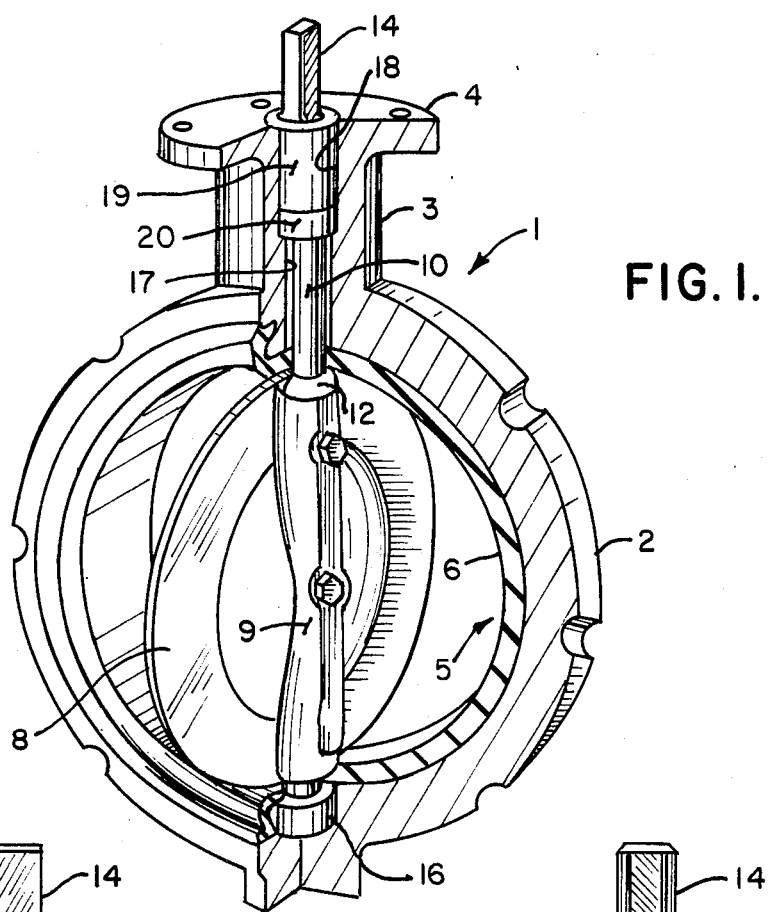
FIG. 2 provides a front view of the butterfly valve shown in FIG. 1.
FIG. 3 provides a vertical sectional view taken along the approximate center line just adjacent to the valve of this invention.
Figure 7:
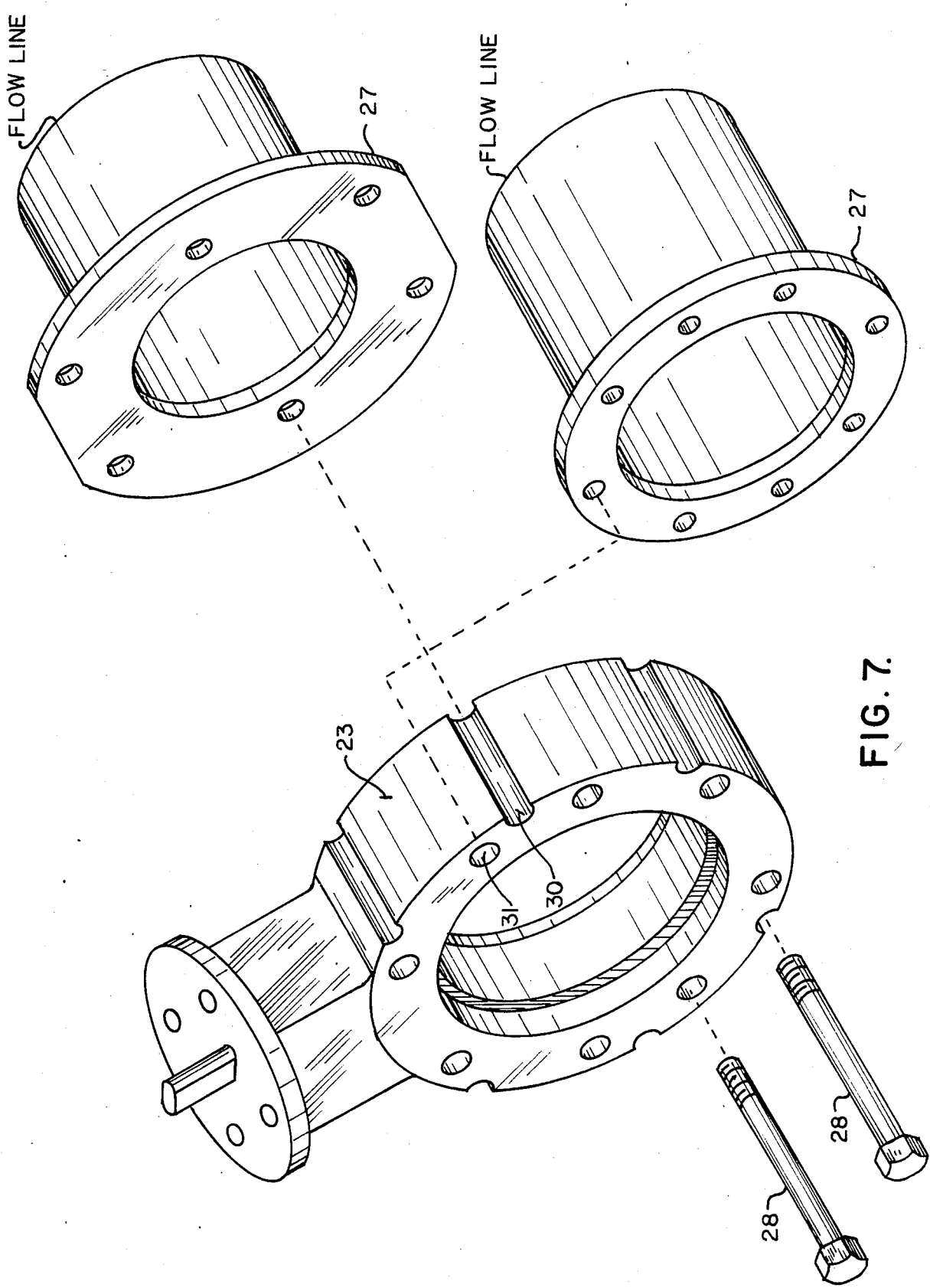
FIG. 7 is a an exploded view of the industrial valve shown in FIG. 4, without its resilient seal being applied thereto, and further discloses the type of flanged pipes forming the material flow line which may be affixed thereto during its installation and usage.

In referring to the drawings the reinforced industrial butterfly valve 1 of this invention is generally disclosed, and incorporates its tubular housing 2, having an integral upper projecting boss means 3, to provide support for mounting of the various operating components of this valve, as will be subsequently explained, and which likewise incorporates a flange means 4 thereon, and to which a handle means (not shown), may secure for use for either manual or automatic operations of this particular valve. As can be seen, the tubular housing 2 incorporates a flow passage, as at 5, therethrough, and through which the various types of materials being handled are designed for freely passing, particularly when the valve is maintained in its opened condition, as shown in the various figures of these drawings. As previously explained, the tubular housing 2 of this invention may insert within any form of flow line, and be used in conjunction with various pneumatic or pressure unloadings or conveyances of materials, whether they be of a liquid or granular consistency, or the invention may be incorporated within aeration devices, blowers, dust collectors, and other multitude of flow lines in which some control is required.

As can be seen in FIG. 3, there may be provided a resilient seat, as at 6, around the interior perimeter of the flow passage 5, and said seat may be formed of any type of highly abrasion resistant compound, such as rubber or a polymer, and which is held into position through its premolding to incorporate an external groove that cooperatingly mates onto the keystone 7 integrally formed within the inner periphery of the housing 2.

The valve means of this invention includes the disc valve 8, which is preferably formed as a stainless steel type disc, and is precision machined for providing a very positive seal in conjunction with the resilient seat 6, when the valve is maintained in closure. The perimeter edges of the disc are contoured, for lowering the operating torque necessary to effect its pivot, particularly when it is shifted into closure, and is maintained in contact continuously around its perimeter with the resilient seat, as previously explained. Thus, increased seal life is attained. But, in addition, due to the contoured and narrowing edges for the formed disc valve, maximum product flow is likewise achieved when the disc valve is arranged in its fully opened position, as shown in the various figures of the drawing. It should be noted that the disc valve is formed having an enlarged central portion, as at 9, arranged approximately diametrically of the formed valve, and through which is provided a channel into which the valve stem tightly inserts, and is held therein by means of a pair of fasteners, such as the screws, as shown. In addition, this enlarged central but integral portion the disc valve, as can be seen, has upper and lower contoured edges, as at 12 and 13, so as to likewise provide for a formed disc hub that is in constant contact with the curved but reasonably flat surface of the resilient seal 6, so as to assure that product seal is maintained, even under vacuum or pressure operated conditions, so as to assure that positive seal against leakage, when the disc valve is turned ninety degrees into closure, from that which is shown in the drawing.

The stem 10 extends upwardly from its connection with the disc valve 8, as at the location 14, and provides a projecting stem, incorporating some shape, in order to have applied thereon some form of a handle means, or other operating mechanism, and which can provide for the manual or automatic opening or closing of the butterfly valve during its application and usage.

Provided within the tubular housing 2, particularly at its lower segment, is an aperture, as at 15, but in this particular instance, the aperture is formed as a counterbore 15a, which does not extend all the way through the said housing, and which is formed for accommodating the proximate stem end so as to mount it rather precisely for its pivot and a turning of its associated disc valve during application. But, as previously alluded to, arranged tightly within the counterbore 15a is a bushing 16, of the type as previously explained, and which is pressure fitted therein. So as to provide for its firm retention, and which bushing is shaped as an annulus for accommodating the proximate lower extending end of the stem 10. Likewise, the upper part of the tubular housing 2, in addition to its projection 3, includes an aperture, as at 17, aligned therethrough, and which aperture likewise incorporates a counterbore, as at 18, and into which a corresponding bushing 19 may be preferably pressure fitted, and to function for the purposes as previously explained in this application for providing an enchanced type of butterfly valve for use for a longer life during industrial applications. In this particular instance, before the bushing 19 is inserted therein, it is preferable to include a stem packing 20, which may be formed as a Buna-N self adjusting secondary stem seal that insures that positive seal for pressure or vacuum service when the butterfly valve of this invention is used under those rigid conditions. Thus, not only does the bushing 19, in addition to the bushing 16, provide for an enhanced life for the valve during its operations and usage, but such bushings prevent corrosion, by eliminating the metal-to-metal contact between the valve disc, its stem, and the formed tubular housing, and likewise, prevent any gaulding and frozen valve stems during continuous usage, particularly under inclement weather conditions as when the ambient environment may be wet and cold. In addition, the upper stem bushing 19 is located at a position, proximate where the operating means (not shown) may couple onto the extending portion 14 of the stem, and at this location the bushing is effective for absorbing any operator's side thrust that may be subjected to it, during manipulation of the stem, while the valve is being opened or closed, during its positioning.

Preferably, the housing 2 is fabricated of standard aluminum, or it may be formed of nodular iron, cast iron, and epoxy coated aluminum for longer life. The other operating components, such as the disc valve, in addition to its stem, may be formed of stainless materials, so as to enhance and preserve their useful life, particularly during industrial applications. Furthermore, as previously explained, the bushings may preferably be formed of a polymer, such as an acetal, for longer life, in addition to reducing frictional contact between the stem, and its operations during pivoting of the disc valve between its open and closed positions. The disc valve of this invention may be fabricated to any size, but in industrial applications sizes extending from approximately two and one-eighth inch to eight and one-eighth inch, have been found to provide that range of diameter necessary for accommodating the flow of most materials handled during industrial applications, whether it be during loading and unloading from a tank trailer, vessel, storage bin, or during routine conveyance through a pipe line.

In referring to FIG. 4, a modified form of butterfly valve 21 is disclosed, and in this particular instance, its disc valve 22, and its operations within the valve housing 23 will be very similar to and related to that which has been previously described herein. But, a further attribute of this particular modification is that the resilient seal 24 seats upon its keystone, in the manner as previously described, as shown at 25 in FIG. 8, and incorporates a laterally extending bead portion 26, with both the seal and its integral beaded portion extending further laterally, or being wider than, the width of the keystone 25, and the housing 23, upon which it seats. Thus, when the flange, as shown at hidden line at 27, of the contiguous and adjacent material flow line pipes or conduits are brought into engagement and locked into position, by means of the fasteners, one as shown at 28, the resilient seal is compressed inwardly, as can be seen, to form a more tighter seal with the disc valve 22, when it is turned into closure. This occurs because the seal has a tendency to compress, and to bulge inwardly, as shown at 29, to continuously maintain that tighter seal.

In addition to the foregoing, and as can also be seen in FIG. 4, the housing 23 of this particular valve is designed for accommodating a variety of flanges 27 or other connecting means or the adjacent flow lines to which this industrial valve inserts. Hence, the peripheral surface of the housing 23 incorporates a series of slots, as at 30, so as to accommodate fasteners, such as the fastener 28, when securing this industrial valve 2, and within a particularly designed flow line.

In addition, there is another series of openings, as at 31, arranged upon a lesser diametrical dimension, and which are formed through the valve housing, in order to accommodate the securement of this particular valve in a flow line of lesser dimensions, and which may have end flanges of smaller diameter. Thus, this particular valve housing may be readily accommodated within a variety of the differing diametered flow lines that are customarily found in the trade, and particularly those which are structured into the type of flow passages that are found in the trucking industry and which convey a variety of industrial and consumer products. These are examples of the type of end flanges, and of multiple diameters for the flanges 27 of the various and variety of material flow lines as are found in industry.

As can also be seen in FIG. 4, the inner diametered openings, as at 31, for connection of this valve housing 23 to the flange 27 of a pair of adjacent flow lines has its openings overlapping the resilient seal 24. Hence, part of the opening, or formed slot, is likewise formed integrally upon the peripheral surface of the seal 24, as can be seen. Thus, this assures that when the flanges 27 of the adjacent flow lines are brought into contiguity with the valve housing 23, and tightened into position by means of the fasteners 28, this assures that the resilient seal will be adequately compressed, in the manner as previously explained, with respect to FIG. 5, as shown at 29, to achieve that particular inward bulge and to guarantee that the disc valve will tightly seal against the resilient seal continuously during the usage and application of this industrial butterfly valve.

As can also be seen in FIGS. 5 and 6, which is a modification to the valve housing 32, the valve housing in this particular instance incorporates its resilient seal 33 thereon, and having its disc valve 34 provided therein. Once again, the valve housing 32 incorporates a series of slots, some of which are contained upon an outer diametrical dimension, as at 35, in order to align with the standard openings provided upon flanges of select material flow lines, while additional slots, as at 36, are provided upon an inner diameter relationship, to accommodate flanges having apertures that are arranged upon a lesser dimension. In this particular instance, where the slots 36 are provided, said slots are arranged just up to the periphery, or the outer surface of the resilient seal 33. Once again, the resilient seal incorporates its bead 37, similar to that as previously explained with respect to the integral bead 26, as shown with respect to FIG. 8.

Variations or modifications to the subject matter of this invention may occur to those skilled in the art upon reviewing the invention as described herein. Such variations or modifications, if within the spirit of this invention, are intended to be encompassed within the scope of any claims to patent protection issuing upon this development. The description of the preferred embodiment set forth herein is done so principally for illustrative purposes only.

Having thus described the invention what is claimed and desired to be secured by Letters Patent is:

1. In an industrial butterfly valve of the type including a disc valve pivotally mounting within a tubular housing, and through which a material flows, said tubular housing having a flow chamber provided approximately centrally therethrough, said butterfly valve being located within a material flow line, said flow line having a passage therethrough and through which material flows as it also passes through the flow chamber of the tubular housing, said butterfly valve incorporating a pivot stem supporting said disc valve for its pivotal movement between the open and closed positions, and pivot mounts in the form of apertures arranged diametrically of and within said tubular housing for mounting for pivotal movement of the stem and disc valve, said stem extending from opposite edges of the disc valve and pivotally mounted to said housing, within its apertures, bushings provided around said stem and upon its extensions from said disc valve and mounting said disc valve and supported stem for pivotal movement within said tubular housing, said housing aperture being counterbored, said bushings tightly fitting within said counterbores to facilitate the pivot of the disc valve and its stem within said tubular housing between its open and material flowing position and to its closed position for impeding the flow of any material therethrough, said housing apertures communicating with said flow chamber, one of said counterbores opening interiorly of the said tubular housing and being in open communication with said flow chamber, the other of said counterbores opening exteriorly of the said housing, each bushing comprising an annulus, formed of a polymer, and provided for reducing the friction against the stem during its pivotal movement while also being corrosion resistant, a resilient seal surrounding said flow chamber and cooperating and in alignment with the disc valve when arranged in its closed position to seal off the flow chamber against passage of any materials therethrough, said tubular housing having a series of openings provided therethrough, and said openings disposed for accommodation of fasteners for securement of the butterfly valve to the contiguous material flow line, said openings being arranged at differing diametrical dimensions to accommodate the securement of differing sized flow lines with the tubular housing of the butterfly valve, said openings provided through the tubular housing also extending partially through the resilient seal surrounding said flow chamber, said resilient seal having a width greater than the width of the tubular housing upon which it mounts, and wherein the connection of the tubular housing and its resilient seal with the material flow line providing for a compressing of the said seal and its tighter fitting with the disc valve when maintained in its closed position.

2. The invention of claim 1 and wherein said resilient seal having a pair of sides, a bead formed integrally upon each side of the resilient seal, whereby upon tightening of the tubular housing and its supported resilient seal with the material flow line said bead being compressed by the said flow line and furnishing a tighter fit of the disc valve within the seal when maintained in its closed position by decreasing the internal diameter of the said resilient seal about the disc valve.

3. The invention of claim 2 and wherein said polymer comprising carboxylated nitrile formed of polymerizing the combination of butadiene, acrylonitrile, and carboxylic acid, thereby substantially enhancing the life of the resilient seal when installed with the butterfly valve within a material flow line.

* * * * *